United States Patent [19]

Tanabe et al.

[11] Patent Number: 4,810,758

[45] Date of Patent: Mar. 7, 1989

[54] RESINOUS COMPOSITION FOR COATING USE, WHICH IS EXCELLENT IN WEATHER RESISTANCE AND IN LOW TEMPERATURE CURING PROPERTIES, ITS PREPARATION AND COATING COMPOSITION CONTAINING THE SAME

[75] Inventors: Hisaki Tanabe, Kyoto; Ryozo Takagawa, Osaka; Hirotoshi Umemoto, Kyoto, all of Japan

[73] Assignee: Nippon Paint, Co., Ltd., Osaka, Japan

[21] Appl. No.: 25,281

[22] Filed: Mar. 12, 1987

[51] Int. Cl.$^4$ .................. C08C 11/22; C08F 20/00
[52] U.S. Cl. ..................... 525/348; 525/123;
525/162; 525/359.2; 525/420; 525/437;
525/440; 525/443; 525/448; 525/454; 525/462;
525/528; 525/533
[58] Field of Search ............... 525/437, 448, 462, 533,
525/348, 359.2, 420, 454; 528/115, 293, 299

[56] References Cited

U.S. PATENT DOCUMENTS 2,978,435  4/1961  Ernst ........................ 528/115
3,471,446  10/1969  Delves et al. ............. 525/448 X Primary Examiner—Theodore E. Pertilla
Attorney, Agent, or Firm—Wenderoth, Lind & Ponack

[57] ABSTRACT

A resinous composition for coating use which is excellent in weather resistance and in low temperature curing properties, comprising a resin having resinous acid value based on carboxyl groups derived from its constituting tetrachlorophthalic acid of 2 to 8, a resinous acid value based on sulfonic acid groups derived from its constituting sulfophthalic acid of 0.5 to 5, and a functional group capable of reacting with a crosslinking agent to be compounded with the resin. The present resin is useful, in the combination form with a crosslinking agent, as a resinous vehicle of a coating composition which is excellent in curing properties, weather resistance, pigment dispersibility and storage stability and is specifically useful as an intermediate or top coat paint for automobile bodies or the like.

3 Claims, No Drawings

RESINOUS COMPOSITION FOR COATING USE, WHICH IS EXCELLENT IN WEATHER RESISTANCE AND IN LOW TEMPERATURE CURING PROPERTIES, ITS PREPARATION AND COATING COMPOSITION CONTAINING THE SAME

FIELD OF INVENTION

The present invention relates to a resinous composition for coating use, which is excellent in weather resistance and in low temperature curing properties, its preparation and a coating composition containing the same.

BACKGROUND OF THE INVENTION

Since an aminoplast obtained by the reaction of a compound bearing an amino group, an acid amide bonding or the like, with formaldehyde, as, for example, melamine resin, urea resin, aniline-formaldehyde resin and the like, has such an active group as active hydrogen, active methylol and active alkoxymethylene, it is generally combined with various resins for coating use having a functional group which is reactive with the abovesaid active group, as hydroxyl group, isocyanate group or the like, including acrylic resin, alkyd resin, polyester resin, epoxy resin, polyurethane resin, polyamide resin, polycarbonate resin and the like, and used as heat curing type coating composition.

Various isocyanate compounds are also used together with such base resins in heat curing type coating compositions. However, such coating compositions generally require high temperature baking, and speaking of the combination of said resins and aminoplasts, are practiced the baking at about 140° C. in the combination of alkyd resin and melamine resin for automobile use and the baking at about 170° C. and more in the combination of epoxy resin and amino resin for coil coating use.

From the standpoint of energy saving, it is, of course, desired to have a low baking temperature and for this end various proposals have been made. One of the proposals heretofore made is to increase an acid value and a hydroxyl number of such resin as alkyd resin, thereby improving the reactivity with aminoplast, and to increase the molecular weight of the resin, thereby improving the curing property thereof. However, this inevitably accompanys with such problems as undesired increase in paint viscosity, lowering in storage stability and decrease in water resistance of the formed film. Attempts have also been made to increase the molecular weight of aminoplast and improve the curing property of the coating composition but the results have been proved to be almost null because of causing additional problem of poor compatibility with alkyd and other resins. There is another proposal of adding an external catalyst as p-toluene sulfonic acid, phosphoric acid and the like to the combined mixture of coating use resin and crosslinking agent. However, no satisfactory results are obtained, giving only poor pigment dispersion stability, causing segregation, due to the presence of external acid catalyst, poor storage stability of the coating composition due to the gradual curing at room temperature and lowering of water resistance of the film. In case that the isocyanate compounds are used as crosslinking agents, employment of external catalyst as tin compound, amino compound and the like, will cause decrease in pot-life of the coating composition, resulting inferior working properties thereof.

From the foregoing, the inventors, having made indeavors for obtaining a coating composition which comprises a coating use resin and a crosslinking agent, has an improved curing property without the necessity of using an external catalyst, is curable at a low temperature or in a shorter period of time, and is excellent in storage stability, capable of resulting excellent film performance, have completed the invention of Japanese Patent Application No. 232900/82 (now publicly opened as Japanese Patent Application Kokai No.124960/84).

In that invention, was provided a coating composition with improved curing property which comprises at least one resin whose acid value based on carboxyl groups of polycarboxylic acid showing a titration midpoint potential of more than $-300$ mV in a non-aqueous potentiometric titration under the state capable of developing a resinous acid value, is 2 to 50 and which bears functional group being reactive with a crosslinking agent, and at least one crosslinking agent, the weight ratio of said resin to said crosslinking agent being, on solid basis, 95/5 to 45/55.

However, in the latest automobile and other industries, the so-called metallic coating composition containing aluminium powder or the like is often applied on an intermediate or top coat layer. In such a metallic coating, it is very common to adopt the so-called two-coat-one-bake coating system wherein a metallic coating composition containing metallic powder is first applied, followed by a clear coating, and thus obtained coatings are then baked in one step.

However, there are many cases where white blooming and blisters are appeared on the coating exposed to lights and especially ultra violet rays or rain falls. This is believed to be due to the fact that said ultra violet rays or rain water will penetrate through the metallic coating and acts directly upon the underlaying intermediate or top coat, thereby causing interface adhesive failure and then white blooming or blisters of the metallic coating.

Therefore, in the related technical fields, public attentions are directed to the importance of weather resistance against transmitted light of such intermediate or top coat layer. In the aforesaid Japanese Patent Application No. 232900/82, such aromatic acids as phthalic anhydride, pyromellitic acid, pyromellitic anhydride, trimellitic acid, trimellitic anhydride, tetrachlorophthalic anhydride, tetrachlorophthalic acid, tetrabromophthalic anhydride, tetrabromophthalic anhydride, HET acid, HET anhydride and the like are intended as the polycarboxylic acid showing the required titration midpoint potential, in a non-aqueous potentiometric titration under the state capable of developing the resinous acid value, of more than $-300$ mV and a resin having an acid value based on carboxyl groups of such aromatic acid of 2 to 50 is combined with an aminoplast resin or the like to obtain a resinous composition which is curable at a low temperature without the necessity of using an external catalyst.

However, subsequent studies have revealed the fact that if a resinous acid value based on such acid is too excessively high, the weather resistance against transmitted light of the resulted resinous composition will get worse on the contrary. For example, in the case of a resin containing as a part of acid components, tetrachlorophthalic anhydride, if a resinous acid value based on said particular acid exceeds over 8, there is a tendency that weather resistance against transmitted light of the resulted resin will be extremely lowered.

For the purpose of obtaining improved curing properties at a low temperature, the resinous acid value based on the aforesaid polycarboxylic acid should be as high as possible, which, however, is not desired from the standview of obtaining an improved weather resistance against transmitted light of the resin. Thus, the both requirements are in conflict with each other.

In the case where a sulfonic acid is added to a resinous composition for coating use as an external catalyst, there are no particular problems in both respects of low temperature curing porperties and weather resistance against transmitted light, and therefore, it is quite natural that one may try to use this type of external catalyst in a resinous composition of Japanese Patent Application No. 232900/82 to make up a deficient resinous acid value for the improvement in the weather resistance against transmitted light.

However, since a sulfonic acid must, in general, be added in a considerable quantity to a resinous composition for the intended objects, additional problems of lowering in pigment dispersion stability and storage stability are always accompanied therewith.

It is, therefore, an object of the invention to provide a resinous composition for coating use which is useful in an intermediate or top coat paint and is excellent in low temperature curing properties weather resistance against transmitted light, pigment dispersibility and storage stability of the coating composition.

SUMMARY OF THE INVENTION

According to the present invention, is provided a resinous composition for coating use which is excellent in low temperature curing properties and in weather resistance against transmitted light, comprising a resin having a resinous acid value based on carboxyl groups derived from its constituting tetrachlorophthalic acid of 2 to 8, a resinous acid value based on sulfonic acid groups derived from its constituting sulfophthalic acid of 0.5 to 5, and a functional group capable of reacting with a crosslinking agent to be compounded with the resin.

In the present resin, the resinous acid value based on carboxyl groups derived from its constituting tetrachlorophthalic acid is limited in a range of 2 to 8 so that the weather resistance against transmitted light of the resin can not be ruined, and a deficient resinous acid value for the purpose of improvement in low temperature curing properties is made up with the sulfonic acid groups derived from its constituting sulfophthalic acid. Furthermore, by the inclusion of said tetrachlorophthalic acid and sulfophthalic acid components in the resin, a pigment dispersion stability and a storage stability of the coating composition are greatly and unexpectedly improved. The invention has been made on the basis of the aforesaid novel findings.

The present resinous composition may be advantageously prepared by reacting Wa parts by weight (on solid basis) of a base resin having both functional group reactive with carboxyl group of an acid and functional group reactive with a crosslinking agent, and Wb parts by weight of $$Wb = \frac{N \cdot Wa}{\frac{56100}{143}\left(1 - \frac{P}{100}\right) - N}$$

in which P is the reaction % of carboxyl groups of tetrachlorophthalic anhydride to be reacted with the base resin and is determined so as to fulfil the requirement P≧50; N is the resinous acid value based on carboxyl groups derived from tetrachlorophthalic acid in the final resin and is determined in a range of 2 to 8, and with Wc parts by weight of sulfophthalic anhydride:

$$Wc = \frac{N' \cdot Wa}{\frac{56100}{228} - N'}$$

in which N' is the resinous acid value based on sulfonic acid groups derived from sulfophthalic acid in the final resin and is determined in a range of 0.5 to 5, simultaneously or in any succesive order.

Incidentally, in the abovesaid equations, the number 143 shows carboxyl equivalent of tetrachlorophthalic anhydride and the number 228 is the sulfonic acid euqivalent of sulfophthalic anhydride.

However, from the standpoint of reaction temperatures involved, particular preference is given to the method wherein tetrachlorophthalic anhydride is first reacted with the base resin and sulfophthalic anhydride is then reacted with thus obtained reaction product.

The invention, therefore, includes both resinous composition for coating use and preparation thereof, as well as the coating composition containing thus obtained resinous composition.

In the present specification and claims, the term "crosslinking agent" denotes "aminoplast and isocyanate compound", the term "functional group reactive with a crosslinking agent" means "functional group which is reactive with active hydrogen, active methylol or active alkoxymethylene possessed by aminoplast or functional group which is reactive with isocyanate possessed by isocyanate compound". The term "functional group reactive with carboxyl group" means "any functional group which is reactive with carboxyl group, including hydroxyl, acid amide bonding and the like".

In the present invention, particular acids having particular acidities (titration midpoint potential more than -300mV) are incorporated into a base resin bearing functional group reactive with a crosslinking agent so as to develop each specified resinous acid values, and thus obtained resin is compounded with a crosslinking agent to give a coating composition having self-catalytic activity.

As a base resin bearing a carboxyl group and a functional group which is reactive with a crosslinking agent, one may use, as already stated, any of the resins selected from alkyd, polyester, acrylic, epoxy, polyurethane, polyamide, polycarbonate resins and the like, curable with aminoplast or isocyanate compound.

The heat curing may be of any type of the following: reaction between hydroxyl and active methylol groups; reaction between hydroxyl and active alkoxymethylene groups; reaction between an active hydrogen bearing group as hydroxyl, carboxyl, amino or imino group, and isocyanate group and the like. Various other reactions have also been known. However, since they will not constitute the characteristic feature of this invention and are well known in the art, the details are omitted herein.

For the sake of briefness, the invention shall be now explained with the combination of resin having both carboxyl and hydroxyl groups (the latter may also be the functional group reactive with crosslinking agent) and aminoplast (crosslinking agent). In this case, the hydroxyl group has in fact the aforesaid dual functions.

When the hydroxyl bearing resin is reacted with a polycarboxylic acid, e.g. di-, tri- or tetra-carboxylic acid, or its anhydride, at least one of the carboxyl groups of the acid may be participated into the reaction and used in the esterification, thereby taken into the polymer, and the remaining carboxyl group may be left in the polymer in a state capable of developing a resinous acid value. The hydroxyl groups not reacted with said polycarboxylic acid may also be in the resulting resin. At this time, the resinous acid value based on said particular carboxyl groups may be freely controlled by the regulation of the amount of said polycarboxylic acid to be used and reaction % thereof. In the present invention, it is essential that tetrachlorophthalic acid and sulfophthalic acid are incorporated into the base resin which is to be compounded with an aminoplast so that the resinous acid value based on carboxyl groups derived from said tetrachlorophthalic acid is 2 to 8 and the resinous acid value based on sulfonic acid groups derived from the sulfophthalic acid is 0.5 to 5.

For this end, tetrachlorophthalic anhydride and sulfophthalic anhydride are advantageously used each in the specified amounts hereinbefore defined.

The inventors have found that when the resinous acid value based on carboxyl groups from said tetrachlorophthalic anhydride in the final resin is less than 2, the present object of curing promotion cannot be attained, and even when the deficient resinous acid value is supplemented by the inclusion of sulfonic acid groups of said sulfophthalic anhydride for the improvement of curing properties, it is always followed by an extreme decrease in storage stability of the coating composition, and that when the resinous acid value based on carboxyl groups from said tetrachlorophthalic anhydride exceeds over the upper limit of 8, there is a marked tendency that weather resistance against transmitted light will become deteriorated.

Furthermore, speaking of the resinous acid value based on sulfonic acid groups, at the level of less than 0.5, even when the resinous acid value based on carboxyl groups is at the upper limit of 8, there still remains unsolved question of insufficient curing properties, whereas at the level of more than 5, there is a tendency that storage stability of the coating composition will get worse. From the foregoing, the inventors have come to the conclusion that the resinous acid value based on carboxyl groups derived from tetrachlorophthalic acid in the final resin should be in a range of 2 to 8 and the resinous acid value based on sulfonic acid groups derived from sulfophthalic acid should be in a range of 0.5 to 5, for the optimum combination of low temperature curing properties, weather resistance against transmitted light and storage stability of the resulted coating composition.

It has also been found that the best results are obtained with the resin having a resinous acid value based on carboxyl groups from tetrachlorophthalic acid of 3 to 7 and a resinous acid value based on sulfonic acid groups from sulfophthalic acid of 1 to 3.

As already stated, the present resin can be advantageously prepared by reacting Wa parts by weight (on solid basis) of a base resin, e.g. hydroxyl bearing resin, with Wb parts by weight of tetrachlorophthalic anhydride and Wc parts by weight of sulfophthalic anhydride in any reaction order, and most preferably first with tetrachlorophthalic anhydride and then with sulfophthalic anhydride.

Thus obtained resin is, when combined with an aminoplast, very stable at normal temperatures, but shows marked internal catalytic activity at an elevated temperature, resulting improved and accelerated curing. Thus, the curing can be done at a lower temperature or in a shorter period of time as compared with the cases with the heretofore known similar compositions. Moreover, the resulting film is excellent in many respects and can be comparable with those of the known similar compositions. Besides the above, the present coating composition can give a coating with excellent weather resistance against transmitted light, which is one of the most characteristic features of the present composition.

For example, in the combination of melamine resin as aminoplast and alkyd resin as base resin, such composition is usually baked and hardened, as practiced in an automobile industry, at 140° C. for about 30 minutes.

However, by the adoption of the present invention, it is possible to carry out the same extent of baking at 70° to 110° C. or even less temperature, to obtain the similar product. No detectable change in the film performance can be found and besides that, the thus obtained film is excellent in weather resistance against transmitted light. When melamine resin is used as an aminoplast, it should preferably be compatible with the present resin. In this regard, particular preference is given to the melamine resin having more than 2.0 alkoxy groups per molecule. There is no particular limit in the number average molecular weight and it may be in a conventional range of 500 to 3,000 or the like.

Even in the combination with hexamethyoxymethylol melamine, it is possible to attain a low temperature curing and can provide a high solid coating composition therewith. In the present invention, the abovesaid resin having specified resinous acid values based on particular acid groups is compounded with a crosslinking agent in a weight ratio (on solid basis) of 95/5 to 45/55.

Such composition may be used as a clear coating as it is or may be added with pigment and other additives and used as, for example, colored intermediate or top coat in automobile bodies or the like. When the present coating composition is intended to use in the so-called two-coat-one-bake system in the metallic coating of automobile bodies, the excellent weather resistance against transmitted light is, in fact, made the best use of, and hence such an application is highly recommended.

At the time when isocyanate compound is selected as a crosslinking agent and external catalyst is added to a coating composition, troubles have always been encountered in the pot-life of the composition. However, with the present resinous composition, it is possible to formulate, without the necessity of adding an external catalyst, a coating composition capable of producing an excellent coating and having an improved pot-life. Thus, in the present invention, there is provided a resinous composition being useful as resinous vehicle in a coating composition which is characterized by excellent curing properties, storage stability, film performance and especially weather resistance against transmitted light, without the necessity of using an external catalyst as in the conventional ones. Therefore, the invention is quite important from the standview of saving natural resources.

The invention shall be now more fully explained in the following Examples. Unless otherwise being stage, all parts and percentages are by weight.

EXAMPLE 1

Preparation of resinous composition of polyester resin whose acid value based on carboxyl groups derived from tetrachlorophthalic acid is 5 and acid value based on sulfonic acid groups derived from sulfophthalic acid is 2.5;

Into a reaction vessel fitted with a heating device, a stirrer, a refluxing device, a water separator, a fractionator and a thermometer, were placed the following 5 starting materials and the mixture was heated.

| | |
|---|---|
| isophthalic acid | 2271 parts (by weight) |
| adipic acid | 500 |
| trimethylolpropane | 209 |
| neopentylglycol | 2890 |
| dibutyl tin oxide | 1.3 |

Stirring was commenced at the stage when they were melted to a stirrable condition, and the vessel temperature was raised to 215° C. in 3 hours. The formed condensed water was continuously removed out of the system.

When the temperature reached 215° C., the reaction vessel was maintained at the same temperature for 30 minutes and then gradually added with 135 parts of xylene as a refluxing solvent. The reaction was then switched to a condensation in the presence of said solvent and continued for a while. At the stage when the resinous acid value reached 2.6, the reaction was covered and the content was allowed to cool to 100° C.

Next, 1494 parts of ε-caprolactone were added and the mixture was heated to 150° C. The reaction was continued at the same temperature, while sampling and checking the amount of unreacted ε-caprolactone by IR analysis, until the reaction rate reached 98% and more, and thereafter, the mixture was allowed to cool to obtain polyester prepolymer (A-1).

At this stage, the adding amounts (Wb) of tetrachlorophthalic anhydride and the amounts (Wc) of sulfophthalic anhydride per 1000 parts of said polyester prepolymer (A-1) were calculated as follows:

$$Wb = \frac{5 \times 1000}{\frac{56100}{143}\left(1 - \frac{50}{100}\right) - 5} = 26.2$$

$$Wc = \frac{2.5 \times 1000}{\frac{56100}{228} - 2.5} = 10.3$$

To 1000 parts of said polyester prepolymer (A-1), were added 26.2 parts of tetrachlorophthalic anhydride and the combined mixture was heated to 150° C.

The reaction was continued at 150° C. until the resinous acid value reached 7.0 and at this stage, the reaction was covered and the mixture was allowed to cool to 80° C. 10.3 parts of sulfophthalic anhydride were added to the said mixture and the combined mixture was heated to 110° C. The reaction was continued at 110° C. until the resinous acid value reached 12.0, and thereafter, the mixture was allowed to cool and added with 239 parts of xylene to obtain polyester resin solution A. This solution A showed non-volatile content 80.1%, viscosity (Gardner viscosity, 25° C.) W-X, and resinous acid value 11.6.

By using a non-aqueous potentiometric titration technique with n-tetrabutylammonium hydroxide as titration reagent, it was confirmed that the resinous acid value based on carboxyl groups from tetrachlorophthalic acid in the final resin was 5 and the resinous acid value based on sulfonic acid groups from sulfophthalic acid was 2.5.

EXAMPLES 2 TO 5

Using the same procedures as stated in Example 1, but substituting the materials indicated in Table 1 for those of Example 1, polyester varnishes B to E were prepared. The characteristics of these varnishes are also shown in Table 1.

COMPARATIVE EXAMPLES 1 TO 4

Using the same procedures as stated in Example 1, but substituting the materials indicated in Table 1, comparative polyester varnishes I to K were prepared as Comparative Examples 1 to 3.

In Comparative Examples 1 and 2, the resinous acid value based on carboxyl groups from tetrachlorophthalic acid was designed to be 10.15 and in Comparative Example 3, the resinous acid value based on sulfonic acid groups from sulfophthalic acid was designed to be 8.

In Comparative Example 4, a conventional polyester varnish L whose polyester resin was not modified with tetrachlorophthalic acid and sulfophthalic acid was prepared by a normal procedure.

The characteristics of these resin varnishes are also shown in Table 1.

EXAMPLE 6

Into a similar reaction vessel as used in Example 1, the following 6 materials were placed and reacted until the resinous acid value reached 2.5.

| | |
|---|---|
| hexahydrophthalic anhydride | 793 parts |
| isophthalic acid | 567 |
| trimethylolpropane | 365 |
| neopentylglycol | 694 |
| Cardula E-10 (epoxy compound, trademark of Shell Chem. Co.) | 373 |
| dibutyl tin oxide | 0.7 |

623 parts of ε-caprolactone were then added and reacted as in Example 1 to obtain polyester prepolymer (F-1). To 1000 parts of said polyester prepolymer (F-1), were reacted in successive order Wb parts calculated in the following equation of tetrachlorophthalic anhydride and Wc parts calculated in the following equation of sulfophthalic anhydride as in Example 1, and the resulted product was diluted with 344 parts of xylene to obtain polyester resin solution F.

The characteristics of thus obtained varnish are shown in Table 1.

$$Wb = \frac{5 \times 1000}{\frac{56100}{143}\left(1 - \frac{50}{100}\right) - 5} = 26.2$$

$$Wc = \frac{1.5 \times 1000}{\frac{56100}{228} - 1.5} = 6.1$$

EXAMPLE 7

With the following materials, ester exchange reaction of coconut oil was first carried out and then esterification reaction was effected until the resinous acid value reached 2.0 to obtain alkyd prepolymer (G-1).

| | |
|---|---|
| coconut oil | 1036 parts |
| trimethylolpropane | 975 |
| isophthalic acid | 1150 |
| adipic acid | 253 |
| Neopentylglycol | 155 |

1000 parts of thus obtained alkyd prepolymer (G-1) were diluted with 111 parts of xylene and reacted in successive order with Wb parts of tetrachlorophthalic anhydride and Wc parts of sulfophthalic anhydride as in Example 1.

$$Wb = \frac{8 \times 1000}{\frac{56100}{143}\left(1 - \frac{50}{100}\right) - 8} = 42.5$$

$$Wc = \frac{2 \times 1000}{\frac{56100}{228} - 2} = 8.2$$

The product was then diluted with 455 parts of xylene to obtain alkyd resin solution G.

The characteristics of this solution G are shown in Table 1.

EXAMPLE 8

Into a reaction vessel, were placed 1000 parts of xylene and the content was heated to 115° C.

While maintaining at 115° C., a monomer mixture of the following 5 was dropwise added in 3 hours to effect the polymerization and obtain acryl prepolymer (H-1).

| | |
|---|---|
| styrene | 200 parts |
| methyl methacrylate | 363.2 |
| 2-hydroxyethyl methacrylate | 185.6 |
| 2-ethyl hexyl acrylate | 251.2 |
| azobisisobutyronitrile | 10.0 |

To 1000 parts (on solid basis) of said acryl prepolymer (H-1), were reacted, in successive order, Wb parts of tetrachlorophthalic anhydride and Wc parts of sulfophthalic anhydride at 140° C. and 110° C., respectively, as in Example 1, and the reaction product was diluted with 34.4 parts of methyl isobutyl ketone to obtain acryl resin solution H.

$$Wb = \frac{5 \times 1000}{\frac{56100}{143}\left(1 - \frac{50}{100}\right) - 5} = 26.2$$

$$Wc = \frac{2 \times 1000}{\frac{56100}{228} - 2} = 8.2$$

The characteristics of said solution H are shown in Table 1.

titration midpoint potential in non-aqueous potentiometric titration:

| | |
|---|---|
| isophthalic acid | −310 mV |
| adipic acid | −390 mV |
| tetrachlorophthalic anhydride | −120 mV |
| sulfophthalic anhydride | −50 mV |

TABLE 1

| Example No. | 1 | 2 | 3 | 4 | 5 |
|---|---|---|---|---|---|
| resin solution | A | B | C | D | E |
| base resin | | | | | |
| isophthalic acid | 2271 | 2271 | 2271 | 2271 | 2271 |
| adipic acid | 500 | 500 | 500 | 500 | 500 |
| trimethylolpropane | 209 | 209 | 209 | 209 | 209 |
| neopentylglycol | 2890 | 2890 | 2890 | 2890 | 2890 |
| ε-caprolactone | 1494 | 1494 | 1494 | 1494 | 1494 |
| Wb per 1000 parts base resin | 26.2 | 42.5 | 42.5 | 15.5 | 15.5 |
| resinous acid value (Note 1) | 5 | 8 | 8 | 3 | 3 |
| Wc per 1000 parts base resin | 10.3 | 4.1 | 16.4 | 20.7 | 12.2 |
| resinous acid value (Note 2) | 2.5 | 1 | 4 | 5 | 3 |
| characteristics of varnish | | | | | |
| viscosity | W-X | V | Z | Y-Z | X |
| resinous acid value of final resin | 11.6 | 11.9 | 17.8 | 15.1 | 10.7 |
| non-volatile % | 80.1 | 79.6 | 79.4 | 79.8 | 80.3 |

| Example No. | 6 | 7 | 8 |
|---|---|---|---|
| resin solution | F | G | H |
| base resin | | | |
| isophthalic acid | | | |
| adipic acid | | | |
| trimethylolpropane | stated in the respective Example | | |
| neopentylglycol | | | |
| ε-caprolactone | | | |
| Wb per 1000 parts base resin | 26.2 | 42.5 | 26.2 |
| resinous acid value (Note 1) | 5 | 8 | 5 |
| Wc per 1000 parts base resin | 6.1 | 8.2 | 8.2 |
| resinous acid value (Note 2) | 1.5 | 2 | 2 |
| characteristics of varnish | | | |
| viscosity | Y | $Z_1$-$Z_2$ | Y-Z |
| resinous acid value of final resin | 9.6 | 13.9 | 8.9 |
| non-volatile % | 74.7 | 64.5 | 50.2 |

| Comparative Example No. | 1 | 2 | 3 | 4 |
|---|---|---|---|---|
| resin solution | I | J | K | L |
| base resin | | | | |
| isophthalic acid | 2271 | 2271 | 2271 | 2324 |
| adipic acid | 500 | 500 | 500 | 511 |
| trimethylolpropane | 209 | 209 | 209 | 322 |
| neopentylglycol | 2890 | 2890 | 2890 | 2756 |
| ε-caprolactone | 1494 | 1494 | 1494 | 1508 |
| Wb per 1000 parts base resin | 53.7 | 82.8 | — | — |
| resinous acid value (Note 1) | 10 | 15 | — | — |
| Wc per 1000 parts base resin | — | — | 33.6 | — |
| resinous acid value (Note 2) | — | — | 8 | — |
| characteristics of varnish | | | | |
| viscosity | S-T | V-W | Y | R |
| resinous acid value of final resin | 12.1 | 16.8 | 17.3 | 7.8 |
| non-volatile % | 79.2 | 79.7 | 79.4 | 79.6 |

Note 1 resinous acid value based on carboxyl groups from tetrachlorophthalic acid
Note 2 resinous acid value based on sulfonic acid groups from sulfophthalic acid

EXAMPLE 9

Using the polyester resin solution A obtained in Example 1 and according to the prescription given below, a pigment dispersion paste was prepared. And then, a melamine curing type coating composition was prepared following the solution formulation hereinunder stated.

TABLE A

| Formulation of pigment dispersion paste | |
|---|---|
| Titanium white (Note 1) | 70.1 parts |
| Carbon black (Note 2) | 0.3 |
| resin solution | 8.2 |
| Solvesso 150 | 21.4 |
| Total | 100 |

(Note 1) Titanium R 5N manufactured by Sakai Kagaku K.K., trademark
(Note 2) Mitsubishi Carbon MA-100, manufactured by Mitsubishi Kasei K.K., trademark

TABLE B

| Formulation of coating composition | |
|---|---|
| pigment dispersion paste | 100 parts |
| resin solution | 82 |
| melamine resin (Note 3) | 17.3 |
| methanol | 8.9 |
| surface conditioner | 1.8 |
| Total | 210.0 |

(Note 3) Sumimal M-66B (methyl/butyl mixed etherified melamine resin, trademark of Sumitomo Chem. Co.)

The thus obtained coating composition was diluted with 100 parts of Solvesso 150 (mixed solvent, trademark of Esso Standard) and 50 parts of ethyl acetate to adjust the viscosity to 23 sec./No. 4 Ford Cup (20° C.), and the diluted composition was applied by spraying means onto a Spc-1 dull steel plate previously treated with zinc phosphate and then subjected to a cationic electrodeposition (20μ) so as to give a dry film thickness of 30 to 40μ. After standing for a defined period of time, the coated plate was baked at 140° C. for 30 minutes. In this experiment, thus obtained coating was hereinunder referred to as intermediate coating. Storage stability test of the coating composition and film performance tests of the thus obtained coating were carried out and the test results were shown in Table 2.

Onto thus obtained intermediate coating, a metallic base coat composition shown in the following Table C was applied so as to give a dry film thickness of 5μ in one example, and 10μ in another example, and after setting for 3 minutes, a clear coat composition shown in the following Table D was further applied in dry film thickness of 35μ and the coated plate was finally baked at 140° C. for 20 minutes.

In an additional experiment, the same clear coat composition was directly applied onto the intermediate coating so as to give a dry film thickness of 35μ, and the coated plate was baked at 140° C. for 20 minutes.

TABLE C

| Metallic base coat composition | |
|---|---|
| acryl resin varnish (Note 4) | 100 parts |
| U-van 20SE60 (Note 5) | 33 |
| Alpaste 1109MA (Note 6) | 15 |
| toluene | 10 |
| ethyl acetate | 5 |
| n-butanol | 5 |
| surface conditioner | 0.2 |
| Total | 168.2 |
| Co., non-volatile content 50%, monomer composition: | |
| methyl methacrylate | 35 parts |
| ethyl acrylate | 48 |
| 2-hydroxyethyl methacrylate | 16 |
| methacrylic acid | 1 |

(Note 4) acryl resin varnish manufactured by Nippon Paint
(Note 5) butylated melamine, trademark of Mitsuitoatsu K.K.
(Note 6) aluminium paste, trademark of Toyo Aluminium K.K.

TABLE D

| Clear coat composition | |
|---|---|
| acryl resin varnish (Note 7) | 100 parts |
| U-van 20SE60 | 50 |
| Solvesso 150 | 20 |
| n-butanol | 5 |
| surface conditioner | 0.2 |
| Total | 175.2 |
| Co., non-volatile content 50%, monomer composition: | |
| styrene | 30 parts |
| methyl methacrylate | 10 |
| n-butyl methacrylate | 4.6 |
| 2-ethyl hexyl methacrylate | 40 |
| 2-hydroxyethyl methacrylate | 13.9 |
| methacrylic acid | 1.5 |

(Note 7) acryl resin varnish, manufactured by Nippon Paint

As the weather resistance test against transmitted light, the aforesaid test plates were subjected to Sunshine Weather-O-meter test according to JIS 5400 6.16 for 200 hours and then to moisture vapor resistance test under 50° C. and 98% and more humidity conditions, for 72 hours. After repeating said cycle tests 5 times, adhesive properties and blister resistance of the respective coatings were evaluated. The results are shown in Table 3.

EXAMPLES 10 TO 13

Using the resin solutions B to E obtained in Examples 2 to 5, intermediate coating compositions were prepared as in Example 9. Storage stability of the respective composition and film performance test results of the resulted coatings are shown in Table 2.

Next, the coated test plates were prepared and evaluated as in Example 9.

The weather resistance test results are shown in Table 3.

COMPARATIVE EXAMPLE 5 TO 8

The similar coating composition as given in Example 9 were prepared using the resin solutions I to L obtained in Comparative Examples 1 to 4, in place of the resin solution A. Storage stability tests and film performance tests wee carried out as in Example 9 and the test results were shown in Table 2. The weather resistance tests against transmitted light of the coated test plates were also carried out as in Example 9 and the test results were shown in Table 3.

COMPARATIVE EXAMPLE 9

1.0 part of p-toluene sulfonic acid was added to 100 parts of the coating composition obtained in Comparative Example 8, and an intermediate coating composition was prepared as in Example 9. The storage stability test and film performance tests were carried out and the test results were shown in Table 2. The coated plate was prepared as in Example 9 and weather resistance test against transmitted light wascarried out. The test results are shown in Table 3.

EXAMPLE 14

The similar intermediate coat composition as stated in Example 9 was prepared excepting substituting resin solution C obtained in Example 3 for the resin solution A and using 29 parts of U-van 128 (butylated melamine, trademark of Sumimal M-66B. This was applied onto a SPC-1 dull steel plate as in Example 9 and baked at 100° C. for 30 minutes. Storage stability test and film performance tests were carried out as in Example 9 and the test results obtained were shown in Table 2.

Onto the thus obtained coating, a metallic base coat composition and a clear coat composition were applied and the coatings were baked as in Example 9. The weather resistance test against transmitted light was carried out and the test result obtained was given in Table 3. For the foregoing, it will be clear that the present coating composition containing a combination of a crosslinking agent and a resin whose acid value based on carboxyl groups derived from tetrachlorophthalic acid is 2 to 8 and acid value based on sulfonic acid groups derived from sulfophthalic acid is 0.5 to 5, can give improved curing properties without the necessity of adding an external catalyst, and is excellent in both storage stability of the composition and weather resistance against transmitted light of the coating prepared therefrom.

TABLE 2

| Example No. | 9 | 10 | 11 |
|---|---|---|---|
| resin solution | A | B | C |
| solid content wt % (Note 1) | 67.5 | 68.2 | 65.9 |
| pencil hardness | H | H | 2H |
| impact strength (cm) (Note 2) | 40 | 40 | 35 |
| xylene rubbing (Note 3) | | | |
| humidity resistance | | | |
| 120H adhesion (Note 4) | 100/100 | 100/100 | 100/100 |
| blister (Note 5) | OK | OK | OK |
| 240H adhesion | 100/100 | 100/100 | 100/100 |
| blister | 9F | 9F | 9M |
| storage stability | | | |
| viscosity before storing (KU) | 61 | 62 | 59 |
| viscosity after storing at 50° C. for 10 days (KU) | 61 | 63 | 62 |

| Example No. | 12 | 13 | 14 |
|---|---|---|---|
| resin solution | D | E | C |
| solid content wt % (Note 1) | 66.4 | 67.3 | 62.1 |
| pencil hardness | 2H | H | H |
| impact strength (cm) (Note 2) | 35 | 40 | 35 |
| xylene rubbing (Note 3) | | | |
| humidity resistance | | | |
| 120H adhesion (Note 4) | 100/100 | 100/100 | 100/100 |
| blister (Note 5) | OK | OK | OK |
| 240H adhesion | 100/100 | 100/100 | 100/100 |
| blister | 9F | 9F | 9F |
| storage stability | | | |
| viscosity before storing (KU) | 60 | 58 | 61 |
| viscosity after storing at 50° C. for 10 days (KU) | 63 | 59 | 68 |

| Comparative Example No. | 5 | 6 | 7 |
|---|---|---|---|
| resin solution | I | J | K |
| solid content wt % (Note 1) | 67.4 | 66.8 | 65.3 |
| pencil hardness | B | HB | H |
| impact strength (cm) (Note 2) | 40 | 40 | 35 |
| xylene rubbing (Note 3) | Δ | | |
| humidity resistance | | | |
| 120H adhesion (Note 4) | 100/100 | 100/100 | 100/100 |
| blister (Note 5) | 9F | OK | 9F |
| 240H adhesion | 100/100 | 100/100 | 100/100 |
| blister | 8M | 8F | 8D |
| storage stability | | | |
| viscosity before storing (KU) | 61 | 60 | 61 |
| viscosity after storing at 50° C. for 10 days (KU) | 60 | 60 | 78 |

| Comparative Example No. | 8 | 9 |
|---|---|---|
| resin solution | L | L |
| solid content wt % (Note 1) | 68.2 | 67.1 |
| pencil hardness | 5B | H |
| impact strength (cm) (Note 2) | — | 35 |
| xylene rubbing (Note 3) | X | |
| humidity resistance | | |
| 120H adhesion (Note 4) | — | 100/100 |
| blister (Note 5) | — | 9F |

TABLE 2-continued

| 240H adhesion | — | 90/100 |
|---|---|---|
| blister | — | 6D |
| storage stability | | |
| viscosity before storing (KU) | 61 | 61 |
| viscosity after storing at 50° C. for 10 days (KU) | 57 | 82 |

(Note 1) 1.5 g of the diluted coating composition was dried at 105° C. for 3 hours and the residue was measured.
(Note 2) DuPont type φ = ½" 500 g
(Note 3) After 10 return rubbing tests, the film appearance was evaluated on the basis of the following standards.
  no abnormality
Δ several scars and white blooming
X coating dissolved out
(Note 4) 1 mm crosscuts were made with a razer on the coating and peel test was carried out with a cellophane adhesive tape. The remained crosscuts were determined.
(Note 5) ASTM

TABLE 3

| Metallic base film thickness | | Example | | |
|---|---|---|---|---|
| | | 9 | 10 | 11 |
| 0μ | adhesion (Note 1) | | | |
| | blister | normal | normal | normal |
| 5μ | adhesion | | | |
| | blister | normal | normal | normal |
| 10μ | adhesion | | | |
| | blister | normal | normal | normal |

| | | 12 | 13 | 14 |
|---|---|---|---|---|
| 0μ | adhesion (Note 1) | | | |
| | blister | normal | normal | normal |
| 5μ | adhesion | | | |
| | blister | normal | normal | normal |
| 10μ | adhesion | | | |
| | blister | normal | normal | normal |

| Metallic base film thickness | | Comparative Example | | |
|---|---|---|---|---|
| | | 5 | 6 | 7 |
| 0μ | adhesion (Note 1) | X | X | |
| | blister | 8D | 6D | normal |
| 5μ | adhesion | Δ | X | |
| | blister | 9F | 8D | normal |
| 10μ | adhesion | | Δ | |
| | blister | normal | 9F | normal |

| Metallic base film thickness | | Comparative Example | |
|---|---|---|---|
| | | 8 | 9 |
| 0μ | adhesion (Note 1) | — | |
| | blister | — | normal |
| 5μ | adhesion | — | |
| | blister | — | normal |
| 10μ | adhesion | — | |
| | blister | — | normal |

(Note 1) After conducting the aforesaid peel test, the adhesion properties were evaluated on the basis of the following standards.
  no abnormality
Δ partial peeling between metallic coat and intermediate coat
X complete peeling between metallic coat and intermediate coat

What is claimed is:

1. A resin for coating use which is excellent in weather resistance and in low temperature curing properties, comprising a resin having a resinous acid value based on carboxyl groups derived from its constituting tetrachlorophthalic acid of 2 to 8, a resinous acid value based on sulfonic acid groups derived from its constituting sulfophthalic acid of 0.5 to 5, and a functional group capable of reacting with a crosslinking agent to be compounded with the resin.

2. A process for preparing a resin composition comprising a resin having a resinous acid value based on carboxyl groups derived from its constituting tetrachlorophthalic acid of 2 to 8, a resinous acid value based on sulfonic acid groups derived from its constituting sulfophthalic acid of 0.5 to 5, and a functional group capable of reacting with a crosslinking agent to be compounded with the resin, which is characterized in that Wa parts (in solid weight ratio) of a base resin having both functional group being reactive with carboxyl group and functional group being reactive with a crosslinking agent, are reacted, in any successive order, with Wb parts of tetrachlorophthalic anhydride $$Wb = \frac{N \cdot Wa}{\frac{56100}{143}\left(1 - \frac{P}{100}\right) - N}$$

in which P is the reaction % of carboxyl groups of tetrachlorophthalic anhydride to be reacted with the base resin and is determined so as to fulfil the requirement $P \geq 50$ and N is the resinous acid value based on the carboxyl groups derived from tetrachlorophthalic acid in the final resin, which is determined in a range of 2 to 8, and with Wc parts of sulfophthalic anhydride $$Wc = \frac{N' \cdot Wa}{\frac{56100}{228} - N'}$$

in which N' is the resinous acid value based on the sulfonic acid groups derived from sulfophthalic acid in the final resin, which is determined in a range of 0.5 to 5.

3. A process according to claim 2, wherein the base resin is first reacted with tetrachlorophthalic anhydride and then with sulfophthalic anhydride.

* * * * *